S. LAKE.
APPARATUS FOR VENTILATING AND COOLING STORAGE BATTERY SYSTEMS.
APPLICATION FILED OCT. 31, 1908.
925,708.
Patented June 22, 1909.
2 SHEETS—SHEET 2.
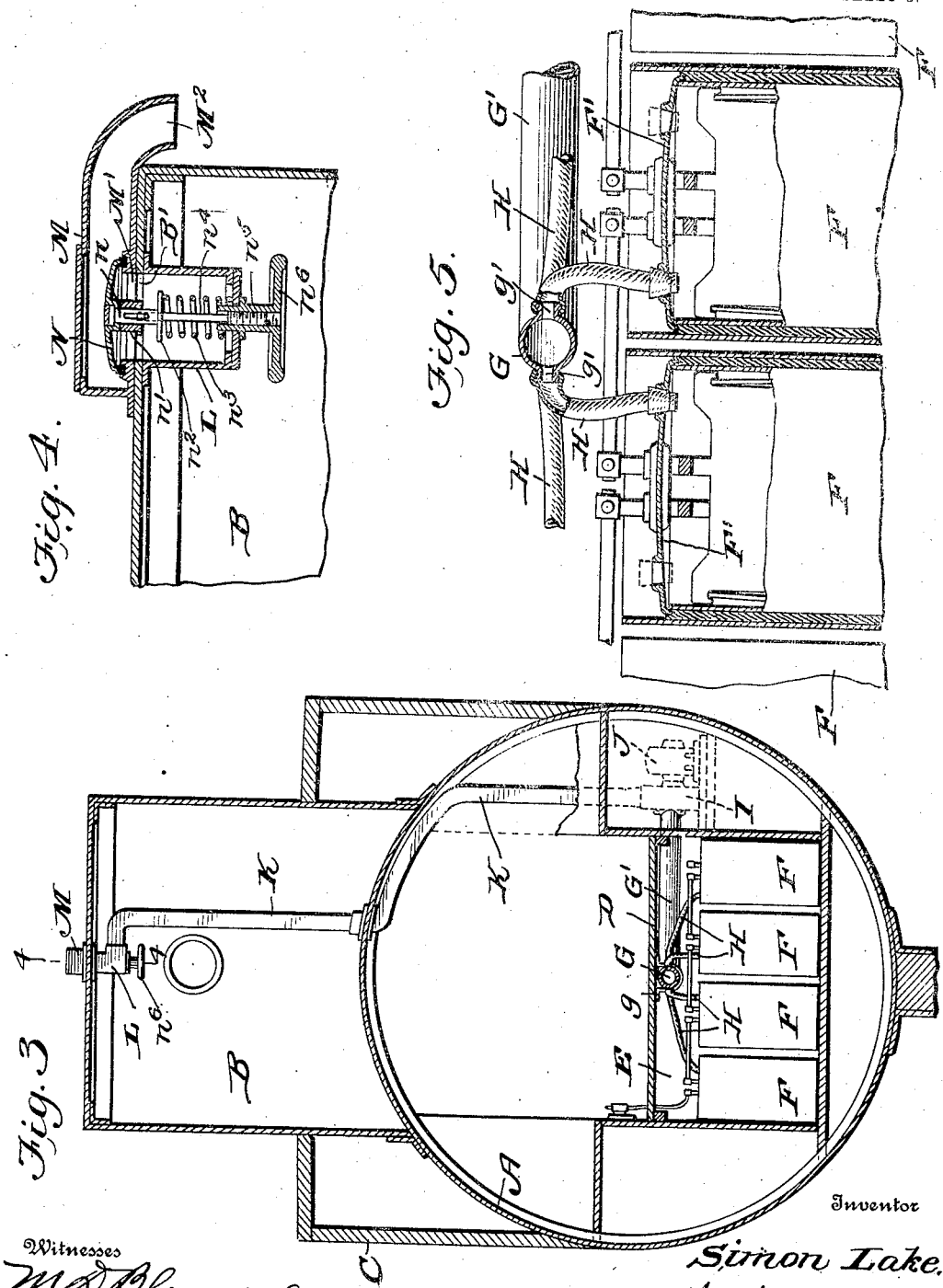

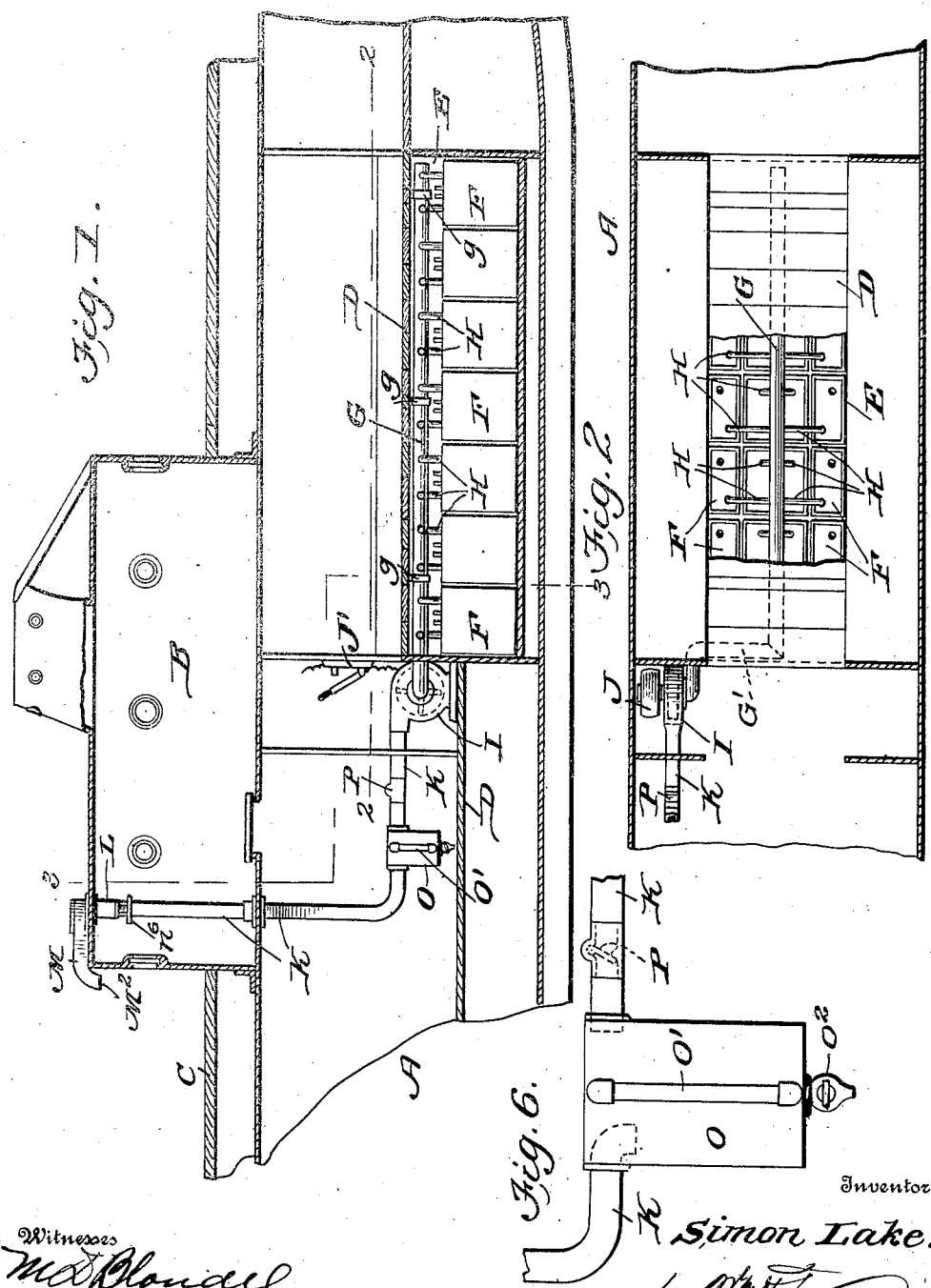

UNITED STATES PATENT OFFICE.

SIMON LAKE, OF BRIDGEPORT, CONNECTICUT.

APPARATUS FOR VENTILATING AND COOLING STORAGE-BATTERY SYSTEMS.

No. 925,708.      Specification of Letters Patent.      Patented June 22, 1909.

Application filed October 31, 1908. Serial No. 460,505.

*To all whom it may concern:*

Be it known that I, SIMON LAKE, a citizen of the United States, and a resident of Bridgeport, in the county of Fairfield and State of Connecticut, have invented a certain new and useful Improvement in Apparatus for Ventilating and Cooling Storage-Battery Systems, of which the following is a specification.

The object of this invention is to provide an apparatus for ventilating and cooling storage-battery-cells and the battery-compartment of a submarine boat which will effectively prevent the escape of the fumes and gases into the adjacent portions of the boat, which gases and fumes accumulate in the cells, especially when the several elements thereof are excited at the time of re-charging the batteries.

To this end the invention comprises a suitable air-duct extending throughout the length of the battery-compartment and provided with a series of branch pipes or sections extended through the covers of the cells. This air-duct is connected at one end to a suction-fan having at its discharge end a pipe that extends through the top of the hull of the vessel, or through the conning-tower, and is provided at or near its eduction end with a non-return exhaust-valve which will prevent ingress of water to the air-duct and cells in the event of the vessel being swept by a heavy sea when the cells are being ventilated; or in case of neglecting to lock the valve in its closed position prior to the submergence of the vessel.

The invention also comprises means for safeguarding against any possibility of water finding its way to the cells in the event of leakage or injury to the said non-return exhaust-valve.

The invention also includes certain specific constructive features which will be hereinafter described.

In the accompanying drawings illustrating the invention in the several figures of which like parts are similarly designated Figure 1 is a diagrammatic vertical longitudinal section drawn through the amidship portion of a submarine vessel and showing the general arrangement of my invention, Fig. 2 is a horizontal section drawn on the line 2—2 of Fig. 1, part of the flooring over the battery compartment being removed to show the battery-cells, the usual bus-bar connection being omitted to clearly illustrate the branch pipes extending from the air-duct. Fig. 3 is a cross-section drawn on a larger scale on the irregular line 3—3 of Fig. 1. Fig. 4 is a sectional view drawn on a larger scale on the line 4—4 of Fig. 3. Fig. 5 is a detail sectional view drawn on a larger scale through the upper portion of two of the battery-cells and the air-duct and illustrating the manner of connecting the branch pipes to the air-duct and to covers of the cells. Fig. 6 is a side view of the trap or catch basin interposed in the discharge pipe.

A designates the hull of a submarine vessel, circular in cross-section and having a conning-tower B and a superstructure C. The hull of the vessel is provided throughout its length with a flooring D the space under which, forward of the longitudinal center of the vessel, is partitioned off to provide a battery-compartment or chamber E in which are arranged the battery-cells F from which the power is derived for operating the vessel when operating below the surface of the water, or in such condition where it is necessary to keep the hatches and ventilators closed. The flooring above the compartment E is so constructed that any portion thereof may be readily removed in order to gain access to the battery-cells. Throughout the length of the compartment is arranged an air-duct G which may be constructed of any suitable material and of any shape, but for present purposes it is shown as a pipe that is suspended from the flooring by yoke bands $g$. Upon opposite sides of this duct, and arranged at intervals throughout its length, are a series of nipples $g'$, preferably formed integral with the air-duct, although they may be made separate and screwed into threaded holes in the sides of the air-duct. Pipe sections H are connected to the nipples and extend to and project through apertures formed in the tops F' of the cell covers and adjacent to their outer ends they are provided with tapering enlargements which tightly fit the apertures to prevent the escape of the gases through the apertures when the fan is not in motion. Each cell cover is provided with two apertures through one of which one of the pipe sections is extended and the remaining aperture of each cover is ordinarily closed by a plug which is removed when the fan is in motion and through which the foul air in the compartment is drawn, and thence led to the air-duct, thus setting up a current of air in the compartment as well as the cells proper which will reduce the temperature of the cells when they are being re-charged, as well as removing the gases. In practice these pipe-sections H are made of flexible material to facilitate handling, but I do not wish to be restricted to such material, as they may be made inflexible if desired.

The rear end of the air-duct G is bent at G' and extended toward one side of the hull of the vessel, and it is connected at its extreme end to the inlet of a suction fan-casing I. The fan (shown in dotted lines) is operated by a suitable electric motor J the current wires to which are connected to a switch J' from which they are extended to the terminals of the batteries or to the dynamo for re-charging the batteries. If desired a separate battery may be employed for operating the fan-motor. The discharge mouth of the fan-casing is connected with a discharge-pipe K which forms a continuation of the air-duct G, and is shown, in the present construction, extended through the hull of the vessel, up into the conning-tower B, and has its upper end connected to the side of a hollow casting L which is securely fastened to the under-side of the top of the said conning-tower and surrounds an opening B' produced in the said tower.

Secured to the top of the conning-tower is a casing M which, at one end is provided with an opening M' that registers with the opening B' and has its opposite or outer end extending rearwardly and terminating in a down-turned eduction mouth portion $M^2$. The bottom of the casing immediately surrounding the opening M' is provided with a raised portion that is annularly grooved to receive a rubber gasket that forms a seat for a non-return exhaust-valve N. A short sleeve section $n$ is swiveled to the valve and projects downwardly therefrom and is slidingly retained in a hub $n'$ arranged centrally in the opening of the casing and connected to the casing by means of web-arms. The sleeve $n$ is prevented from rotation within the hub by a feather and spline (not shown). The lower end of the sleeve terminates in a flange $n^2$ between the lower face of which and the bottom of the casting is interposed a spring $n^3$ whose normal tendency is to expand and raise the valve from its seat, as will appear later on.

A stem $n^4$ is slidingly retained in the sleeve $n$, and carries a pin that fits a slot formed in the said sleeve whereby the valve may be pulled down upon its seat against the influence of the spring. The lower end of the stem $n^4$ is threaded for a short distance and operates in a threaded hub $n^5$ of a handwheel $n^6$ the hub portion of which is journaled in the bottom of the casting as shown.

From the foregoing it will be understood that when the hand-wheel is rotated in one direction the stem will be elevated and the pin moved upwardly in the slot of the sleeve leaving the valve free to be opened by the spring, and at the same time permitting it to be instantly re-seated the moment water or any foreign substance enters the mouth $M^2$ of the casing and contacts with the upper surface of the valve. On the other hand, when the wheel is rotated in a reverse direction, the stem will be drawn downwardly and the pin brought into engagement with the lower end of the slot when the valve will also be drawn down upon its seat and securely locked in position.

A trap or catch basin O is interposed in the discharge-pipe K, so as to arrest any water that may possibly escape through the valve N. As illustrated most clearly in Fig. 6 of the drawings, the trap is shown as a small tank and the section of the pipe extending from the casting L has its inner end extended into the trap and provided with a short down turned elbow, so that in the event of water entering the trap, it will be directed toward the bottom of the tank. The trap is provided with a sight opening or a sight gage O' to enable the occupants of the vessel to detect the admission of water to the trap, and it is also provided with a drain-cock $O^2$ through which the water may be withdrawn.

If desired, the section of the pipe between the catch basin and fan may be provided with a check-valve P, arranged to positively insure against any possibility of water entering the fan-casing and finding its way to the battery-cells and generating noxious chlorin gases.

In operation when the batteries are being re-charged, or at such other times when they are apt to give off gases and fumes, the plugs in the cell covers are withdrawn, the valve N opened, and the fan set in motion, thereby sucking all of the gases and impure air out of the cells and out of the compartment E, and setting up an air-current in the cells as well as in the said compartment and forcing the noxious gases and fumes out through the air-duct and through the non-return exhaust-valve N into the atmosphere, thereby preventing the gases and fumes from entering the adjacent portions of the boat and at the same time, keeping the compartment cool and lowering the temperature of the batteries. As is well known, the temperature is increased by the current set up by the local action between the active material and the supporting plates when being re-charged and this results in loss of energy of the batteries.

While I have described in the foregoing specification the construction of the parts referred to, it is obvious that slight changes in the construction and the arrangements of the parts may be made without departing from the spirit of the invention, and I therefore do not wish myself to be understood as being limited to the exact construction shown. For instance, two or more air-ducts may be arranged throughout the battery compartment instead of only one, and these may be united at one end and extended to the fan and furthermore the duct itself or branches therefrom may be extended down alongside of the batteries and between them so as to set up a current of air to keep the batteries cool while they are being re-charged.

What I claim is:

1. Apparatus for ventilating and cooling storage battery systems, having a storage-battery-compartment, storage-battery-cells arranged therein, an air-duct arranged in the said compartment, branch pipes extending from the said air-duct and communicating with the cells, a fan-casing connected to one end of the said air-duct, a fan operating in the casing, means for operating the fan, a discharge-pipe extending from the said casing and having its discharge end communicating with an opening to the external atmosphere, a casing arranged over the opening, a non-return exhaust-valve controlling admission through the opening, means for locking the valve to its seat, a catch basin interposed in the said discharge-pipe, and a check-valve in the said pipe between the said catch basin and the said fan-casing.

2. Apparatus for ventilating and cooling storage battery systems, comprising a storage-battery-compartment, and storage-battery-cells arranged in the said compartment, covers for the cells provided with openings, an air-duct arranged in the said compartment, branch pipes extending from the air-duct through the openings in said cell covers, means for drawing the gases and fumes from the battery-cells and battery-compartment, a discharge-pipe for carrying off the gases and fumes communicating with an opening leading to the external atmosphere, a casing arranged over the said opening and having one end terminating in a down-turned exhaust mouth, a non-return exhaust-valve controlling the said opening, and means for locking the valve in a closed position.

3. Apparatus for ventilating and cooling storage battery systems, comprising a storage-battery-compartment, storage-battery cells in said compartment, cell covers having openings therein, an air-duct communicating through said cover openings with the cells, and means to withdraw gases and fumes from the cells and compartment and discharge same outboard, said discharge medium including a downturned exhaust mouth and a connected non-return exhaust-valve, said valve having means for locking it in closed position so as to exclude inflow of water or other battery-disturbing mediums.

In testimony whereof I have hereunto set my hand this 15th day of October A. D. 1908.

SIMON LAKE.

Witnesses:
H. A. LOVIAZHNA,
H. CUSTIS VEZEY.